R. R. TAYLOR.
Car Starter.
No. 87,524.  Patented March 2, 1869.
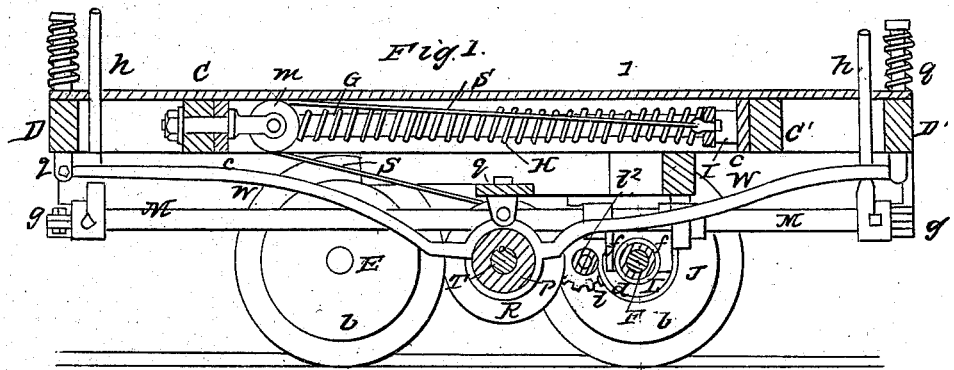
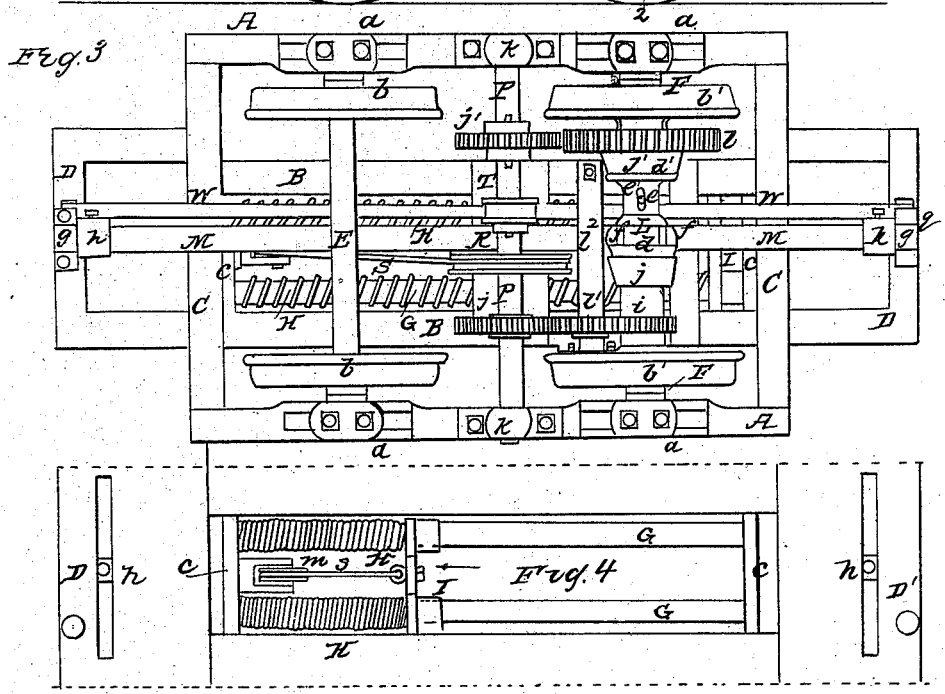
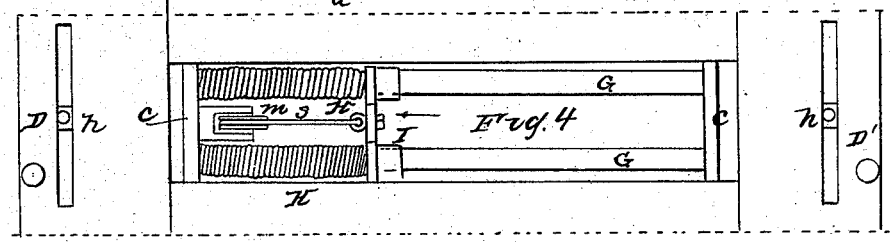
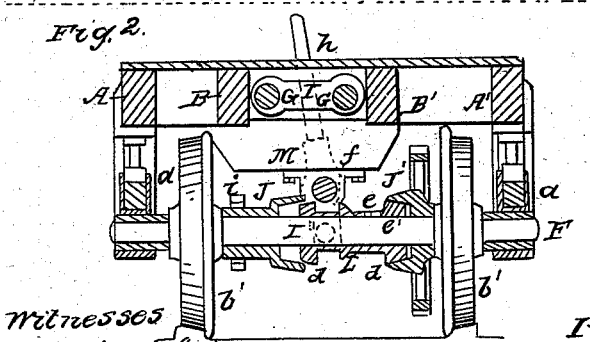
Witnesses
Wm A Steel
Jno B Harding
Inventor
R R Taylor
By his Atty
H Howson

ROBERT R. TAYLOR, OF READING, PENNSYLVANIA, ASSIGNOR TO HIMSELF, JEREMIAH H. BOONE, JONATHAN M. HELLER, AND C. B. BERTOLETTE.

Letters Patent No. 87,524, dated March 2, 1869.

IMPROVED CAR-STARTER.

The Schedule referred to in these Letters Patent and making part of the same.

*To all whom it may concern:*

Be it known that I, ROBERT R. TAYLOR, of Reading, Berks county, Pennsylvania, have invented certain Improvements in Railroad-Cars; and I do hereby declare the following to be a full, clear, and exact description of the same.

My invention consists of certain mechanism, fully described hereafter, whereby the force exerted to stop a car is, in part, absorbed by a spring or springs, so that the recoiling-force of the latter may be exerted to start the car, the mechanism being such that the force applied to compress the springs is exerted through a leverage, and the force of the recoil of the springs for starting the car is also exerted through a leverage, all as fully described hereafter.

In order to enable others skilled in the art to make and apply my invention, I will now proceed to describe its construction and operation, reference being had to the accompanying drawing, which forms a part of this specification, and in which—

Figure 1 is a longitudinal section of a railroad-car truck with my improvements;

Figure 2, a transverse vertical section on the line 1–2, fig. 1;

Figure 3, an inverted plan view; and

Figure 4, a plan view of part of the truck.

Similar letters refer to similar parts throughout the several views.

A and A' are the side-beams, B and B', the centre-beams, C and C', the transverse end-beams, and D and D', the usual extensions or platforms at the ends of a railroad-car, the latter having the usual hangers or bearings, $a$, for the reception of the journal-boxes for the axles E and F, which are provided with the ordinary flanged wheels, $b$ and $b'$.

Two rods, G G, extend longitudinally between the centre-beams B and B', and are secured at each end to plates $c$, or directly to the end-beams of the cars; and upon each of these rods is wound a strong spiral spring, H, arranged to be compressed, as hereafter described, by a cross-head, I, which slides freely upon the rods G G. (See fig. 4.)

Two sleeves, J and J', are arranged to turn loosely upon the axle F, and are enlarged and recessed upon their inner ends, as best observed in fig. 2, for the reception of the tapering ends, $d$ and $d'$, of a friction-clutch, L, on the axle, between the said sleeves.

The clutch L is prevented from turning independently of the axle by a pin, $e$, which enters its slot, $e'$. This pin, however, does not interfere with a longitudinal-sliding motion, which, under the circumstances described hereafter, is imparted to the said clutch, by the arms, $f f$, of a rock-shaft, M, which turns in bearings, $g$, at the opposite ends of the car, and is operated by levers $h$, extending upward through openings in the platforms D D'.

Upon the sleeve J of the axle F is a small cog-wheel, $i$, which gears into a wheel, $i'$, of about equal diameter, on a short spindle, $i^2$, this latter wheel serving merely to connect the wheel $i$ with a larger cog-wheel, $j$, on a shaft, P, which extends transversely across the car, parallel with the axles, and turns in hangers $k$, secured to the opposite side-beams A and A'.

A second cog-wheel, $j'$, of the shaft P, gears directly into a large cog-wheel, $l$, on the sleeve J'; and upon the shaft P, between its cog-wheels, is a pulley, R, to which is secured one end of a cord or chain, S, the latter passing around a pulley, $m$, which projects from the beam C of the truck, and being fastened, at its opposite end, to the cross-head I, between the rods G G.

On the shaft P, between the pulley R and cog-wheel $j'$, is a wheel, T, which is serrated or roughened between its flanges, as seen in fig. 3; and directly above this wheel, and to a cross-piece, $q$, of the car, are pivoted two rods, W W, which partly embrace the said wheel, and extend to the opposite ends of the car. (See fig. 1.)

The outer end of each rod W is connected to a vertical spring-rod, $q$, which passes through the end-bar of the truck, and has, at the top, a button or enlargement, upon which the driver of the car places his foot, when he desires to depress the rod $q$, and to bring its rod W in contact with the roughened surface of the wheel T, this arrangement serving as a brake, to arrest the motion of the shaft P, as will be hereafter described.

The springs H, and the devices described above in connection with them, and with the axle F, are intended to take the place of the usual friction-brakes, the springs being so acted upon by these devices, that when it is desired to stop the car, they shall be compressed, thereby checking the motion of the wheels. The power, however, which is thus absorbed to stop the car, is not wasted, but is stored up in the springs, to aid in again starting the car, when the springs are permitted to recoil.

When the clutch L is free from contact with or adjusted to a position midway between the sleeves J and J', as shown in fig. 1, it can, together with the axle F, be freely turned, without engaging with either of the said sleeves, so that the car may be moved in either direction without interfering with the springs H, which remain extended, as shown.

When, however, it is desired to stop the car, one of the levers $h$ is so turned that the end, $d$, of the clutch shall enter and engage with the sleeve J, causing the latter to turn in the same direction as the axle, and to transmit its motion, through the cog-wheels $i$, $i'$, and $j$, to the shaft P, which also turns in the same direction; and, as the pulley R of the latter is turned, the cord or chain S will be wound upon it, causing the cross-head I to be moved in the direction of the arrow, fig. 4, until the springs H are so compressed that they shall offer sufficient resistance to overcome the momentum of the car.

When the several parts are thus operated, in order to stop the car, the sleeve J' will, through the gearing described, be turned in a direction contrary to that of the axle. This, however, will have no effect, as the sleeve J' is loose, and free from contact with the clutch.

After stopping the car, as above described, the springs H would immediately recoil, and turn the shaft P and axle F in such a direction as to urge the car backward, unless a check were put upon them.

This is prevented by depressing one of the rods $q$ until its brake-rod W is caused to bear against the roughened surface of the wheel T, and thus stop all motion of its shaft.

When the car is to be started, the shaft P is still prevented from turning, by means of the brake W, until the lever $h$ is turned to the position shown in fig. 2, in order to free the clutch from the sleeve J, and engage it with the sleeve J'.

The spring-rod $q$ is then released, and the pressure of the brake-rod W removed from the wheel T; this permitting the shaft P to turn as the cord S is unwound from its drum by the recoil of the springs H H.

The motion given to the shaft P by the recoil of the springs, being in a direction contrary to that before described, would, if transmitted to the axle through the wheels $j$, $i'$, and $i$, move the car backward, but, as it is transmitted directly through the wheels $j$ and $l$, and sleeve J', the axle is turned in a proper direction to start the car.

The main feature of my invention consists in the great power exerted on the springs, to compress the same, the power being transmitted through the wheels described, and consequently through a leverage proportionate to the difference in diameter between the pin $i$ and wheel $j$. In like manner, the power thus absorbed is transmitted to the axle, to start the car, through a leverage proportionate to the difference between the diameters of the wheels $j'$ and $l$.

By this arrangement, the power is absorbed, and applied to the best advantage.

I claim as my invention, and desire to secure by Letters Patent—

1. The clutch L, applied to the axle of a car, in combination with suitable springs, and with gearing, substantially as herein described, by which, through the medium of the clutch, the power required to stop the car is transmitted to the spring with increased force, and the recoiling-power of the spring is transmitted to the wheels, to start the car, with a force greater than that of the spring itself, all substantially as set forth.

2. In combination with the above, the brake-wheel T and brake-levers W W.

In testimony whereof, I have signed my name to this specification, in the presence of two subscribing witnesses.

R. R. TAYLOR.

Witnesses:
 JOHN WHITE,
 LOUIS BOSWELL.